United States Patent [19]
Pletz-Kirsch et al.

[11] Patent Number: 5,161,011
[45] Date of Patent: Nov. 3, 1992

[54] SYNCHRONIZING ARRANGEMENT FOR A PICTURE DISPLAY DEVICE

[75] Inventors: Gerhard Pletz-Kirsch; Jürgen Lenth, both of Hamburg, Fed. Rep. of Germany

[73] Assignee: U.S. Philips Corporation, New York, N.Y.

[21] Appl. No.: 556,931

[22] Filed: Jul. 19, 1990

[30] Foreign Application Priority Data

Jul. 26, 1989 [DE] Fed. Rep. of Germany ....... 3924686

[51] Int. Cl.$^5$ ............................................... H04N 5/04
[52] U.S. Cl. ....................................... 358/148; 358/158
[58] Field of Search ....................... 358/148, 158, 159

[56] References Cited

U.S. PATENT DOCUMENTS

| | | | |
|---|---|---|---|
| 4,636,860 | 1/1987 | Duijkers | 358/148 |
| 4,677,484 | 6/1987 | Pitsch et al. | 358/155 |
| 4,729,023 | 3/1988 | Srivastava | 358/148 |
| 5,038,116 | 8/1986 | Motté | 358/158 |

FOREIGN PATENT DOCUMENTS 0038216  4/1978  Japan .................................. 358/158

Primary Examiner—James J. Groody
Assistant Examiner—David E. Harvey
Attorney, Agent, or Firm—Bernard Franzblau

[57] ABSTRACT

A synchronizing arrangement for a picture display device includes a synchronizing signal separating stage in which horizontal synchronizing pulses are recovered from a television signal applied to the synchronizing arrangement. In addition, the synchronizing arrangement includes a horizontal synchronizing circuit, more specifically a phase-locked loop, to which the horizontal synchronizing pulses are applied for the purpose of synchronization. When, switching criterion is present for a first presettable number of picture lines, the horizontal synchronizing circuit is switched to a fixed rated frequency. When the switching criterion is not satisfied anymore, the horizontal synchronizing circuit is switched back to synchronization by the horizontal synchronizing pulses after a second presettable number of picture lines.

21 Claims, 1 Drawing Sheet

SYNCHRONIZING ARRANGEMENT FOR A PICTURE DISPLAY DEVICE

BACKGROUND OF THE INVENTION

1. Field of the Invention

This invention relates to a synchronizing arrangement for a picture display device, comprising a synchronizing signal separating stage in which horizontal synchronizing pulses are recovered from a television signal which contains a horizontal synchronizing composite signal. The horizontal synchronizing pulses are applied to the synchronizing arrangement and a horizontal synchronizing circuit receives the horizontal synchronizing pulses for synchronizing purposes.

In synchronizing arrangements of this type, which as a rule serve for the purpose of synchronizing the deflection unit of a picture display device with the received television signal, the problem occurs that when there is a lot of noise in the television signal, or when the television signal fails to arrive, the horizontal synchronizing circuit, more specifically a phase-locked loop which is usually present, wanders within its pull-in range, i.e. it does not produce a horizontal synchronizing signal of a constant frequency. As a result, stable picture gating operations are then not possible or the television picture, on which noise is superposed, is additionally disturbed by a faulty synchronization.

2. Description of Related Art

European Patent Specification 0135236 which corresponds to U.S. Pat. No. 4,636,860 (Jan. 13, 1987) discloses a picture display arrangement having a vertical synchronizing circuit, which is provided with a counter arrangement which, in a predetermined time interval, counts the number of times in which the amplified signal with the superimposed noise exceeds a predetermined value. If this happens too often, the mode of operation of certain stages of the picture display device are changed-over. More particularly, the sensitivity of a PLL, which produces the vertical synchronizing signals for a deflection unit is changed. In this arrangement, however, it is a condition that in spite of the prevailing noise, it must still be possible to unambiguously identify the synchronizing pulses. If this is not the case anymore, then it is also impossible for the phase-locked loop to operate correctly and the above-described problems occur.

SUMMARY OF THE INVENTION

An object of the invention is to provide a synchronizing arrangement which supplies a synchronizing signal of a constant frequency, even when the television signal is beset with considerable noise or does not occur at all.

According to the invention, this object is achieved in that in the presence of a switching criterion which is satisfied when a predetermined number of horizontal synchronizing pulses per picture line is exceeded, or when no horizontal pulse per picture line occurs, the horizontal synchronizing circuit is switched to a fixed rated frequency after a first presettable number of picture lines and that when the switching criterion is no longer satisfied, the horizontal synchronizing circuit is again switched to the synchronized state by means of the horizontal synchronizing pulses after a second presettable number of picture lines.

The horizontal synchronizing pulses are derived in known manner in a synchronizing signal separating stage from the received television signal which contains a horizontal synchronizing composite signal (in addition to a vertical synchronizing composite signal which is also present). This mostly occurs in the manner in which the horizontal synchronizing composite signal is compared in the separating stage to a cut-off level. During the period of time in which the cut-off level is exceeded, it is then either possible to generate a horizontal synchronizing pulse directly or an additional time delay may have been provided, after which the horizontal synchronizing pulse is generated.

The synchronizing pulses thus generated are applied to a horizontal synchronizing circuit which is synchronized by means of the pulses. In circuits of this type, a phase-locked loop is usually involved to whose phase comparator the signal of the phase-locked loop is applied and also the horizontal synchronizing pulse for synchronizing purposes. The phase-locked loop is then brought into synchronism with the horizontal synchronizing pulses.

It will be obvious that the phase-locked loop can operate in the desired manner only then when at the predetermined instants a horizontal synchronizing pulse is indeed generated, i.e. only exactly one pulse per picture line. If the received television signal is nevertheless beset with much noise or no television signal is received, several or no horizontal synchronizing pulses are generated in certain circumstances in the synchronizing signal separating stage during the duration of one picture line, which then results in the horizontal synchronizing circuit no longer being synchronized correctly.

In the synchronizing arrangement according to the invention, these disadvantages are obviated in that the horizontal synchronizing circuit is switched to its rated frequency when a switching criterion is present, that is to say it supplies a fixed horizontal synchronizing signal which is independent of the possibly still recognized and possibly faulty horizontal synchronizing pulses. The switching criterion then provided is that during the duration of a picture line a presettable number of horizontal synchronizing pulses must not be exceeded, or that no horizontal synchronizing pulse is detected per picture line, respectively. When the switching criterion is satisfied, the above-described change-over of the horizontal synchronizing circuit is effected. It is then possible, even when no television signal is available anymore, to cause text or similar items to be displayed in the picture.

If the switching criterion is no longer satisfied, then the horizontal synchronizing circuit is again switched, after a presettable number of picture lines, to the synchronizing mode by means of the horizontal synchronizing pulses. When a picture is present which is not beset with too much noise, the synchronization by means of the horizontal synchronizing pulses, which are derived from the received television signal, is again effected in the usual manner.

In accordance with a further embodiment of the invention, the second presettable number of picture lines is the sum of the first presettable number of picture lines and that number of picture lines during which, after the first presettable number of picture lines was reached, the switching criterion was still satisfied.

The second presettable number of picture lines, i.e. that number of picture lines in accordance with which, when the switching criterion is no longer satisfied, a switch back to synchronization by means of the horizontal synchronizing pulses can be effected, can advantageously be made to depend on how many picture lines after the first presettable number has been reached, that is to say after the change-over of the horizontal synchronizing circuit to its rated frequency, the predetermined number of horizontal synchronizing pulses per picture line was exceeded or no horizontal synchronizing pulses were detected. This is effected in such a way that after reaching the first presettable number those picture lines are counted during which the switching criterion was still satisfied. From the instant at which the switching criterion is no longer satisfied, then the horizontal synchronizing circuit is switched to its rated frequency for the same number of picture lines plus the first presettable number of picture lines. Subsequent thereto the horizontal synchronizing circuit is again synchronized by means of the horizontal synchronizing pulses. In this manner, independent of the length of time that the television signal was beset with noise or was not present, the switch back to the synchronization of a television signal which is now available, or is not disturbed by noise anymore, is effected.

In accordance with a further embodiment of the invention, the second presettable number is limited to a predeterminable maximum value. Should a television signal with noise be received for a longer period of time, for which the switching criterion has been satisfied, then the switch back should not be of a corresponding long duration. For this reason the second presettable number is advantageously limited to a predeterminable maximum value, so that the time after which the synchronization is again derived from the received television signal also is limited.

In accordance with a further embodiment of the invention, the arrangement includes a first counter which counts the number of horizontal synchronizing pulses of each picture line and which, when the switching criterion is satisfied, applies a corresponding signal to a second counter which is clocked by the output signal of the phase control loop and which, when the switching criterion is satisfied, counts the picture lines starting from a starting position and when the first presettable number of picture lines is reached, triggers the change-over of the horizontal synchronizing circuit to the rated frequency.

A first counter is provided which serves to determine how many apparent horizontal synchronizing pulses are detected in each picture line. If then a presettable number of pulses is exceeded within one line or if no horizontal pulse is detected, then the switching criterion is satisfied and a corresponding signal is applied to a second counter. For the period of time in which this signal is applied to the second counter, this counter, which is clocked by the output signal of the phase-locked loop, counts the picture lines starting from a starting position. If, in this situation, the second counter reaches the first presettable number of picture lines, then it triggers the switch of the horizontal synchronizing circuit to the rated frequency. Consequently, the switch is not effected until after the first presettable number of picture lines has been reached. This ensures that a switch is not already effected at disturbed, individual picture lines.

For the features described in the foregoing it should be noted that the switching criterion must be satisfied during the overall period of time. If the switching criterion is not satisfied even for a brief period of time, then the counter is again reset to its starting position and, when the switching criterion is satisfied again, counting is started again from this starting position. The switching criterion must therefore be satisfied uninterruptedly for the duration of the first presettable number of picture lines in order ensure that the above-described switch is effected. Thus it is ensured that the switch is only effected when the television signal is permanently beset with noise or is not available. Brief interferences for the duration of some picture lines occur without effect.

In accordance with a further embodiment of the invention, the second counter counts only to the maximum value and then it counts back to its starting position when the switching criterion is not satisfied anymore, and when this starting position has been reached, it triggers the feedback of the horizontal synchronizing pulses to the horizontal synchronizing circuit.

In the case in which the switching criterion was present for a sufficiently long period of time and the first presettable number was reached, i.e. the switchover of the horizontal synchronizing circuit to the rated frequency has been effected, the second counter continues to count from this instant to a maximum value. If the switching criterion is not satisfied anymore, then, starting from this maximum value, the counter counts back until it reaches its starting position. The horizontal synchronizing circuit is not switched back to the synchronization by means of the horizontal synchronizing pulses until this starting position has been reached.

If, after the first presettable number has been reached, the switching criterion is still present for some lines, but the maximum value has not been reached, then in this case a count-back occurs until the starting position, starting from the value reached. In this case the horizontal synchronizing circuit is consequently switched back at an earlier instant to the synchronization mode by means of the horizontal synchronizing pulses than in the above-described case, in which the second counter has reached its maximum value. As a result of this, the switch-back of the horizontal synchronizing circuit to the synchronizing mode by means of the horizontal synchronizing pulses is made to depend on the length of time that the switching criterion was satisfied.

BRIEF DESCRIPTION OF THE DRAWING

An embodiment of the invention will now be described in greater detail with reference to the accompanying drawing, in which.

DESCRIPTION OF THE PREFERRED EMBODIMENT

Figure 1:
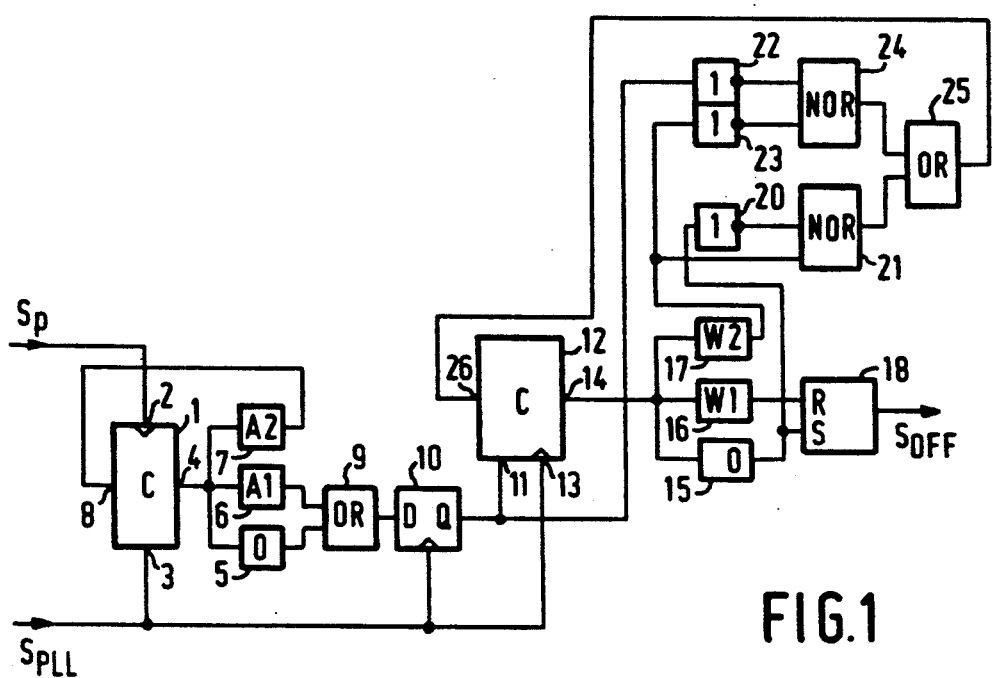
FIG. 1 is a detailed block circuit diagram of a synchronizing arrangement.

A synchronizing arrangement, shown in FIG. 1, for a picture display device is used for the control of a horizontal synchronizing circuit, not shown, which may more specifically be a phase-locked loop (PLL).

The synchronizing arrangement shown in the Figure receives a signal $S_p$ from a synchronizing signal separating stage which is also not shown in the Figure. This signal is the horizontal synchronizing pulses which, in the synchronizing signal separating stage, are recovered from the horizontal synchronizing composite signal of the television signal. This can be effected in, for example, the known manner described in the opening paragraph.

The synchronizing arrangement shown in FIG. 1 has a first counter 1 whose clock input 2 receives the signal $S_P$ from the synchronizing signal separating stage, not shown in the Figure. A signal $S_{PLL}$, which represents the output signal of a horizontal synchronizing circuit, not shown in the Figure, which is structured as a phase-locked loop, is applied to a reset input 3 of the counter 1. The signal present at an output 4 of the counter 1 is applied to three comparators 5, 6 and 7. The comparator 5 compares the output signal of the counter 1 for identity to the value zero, the comparator 6 for identity to a predetermined value A1 and the comparator 7 for identity to a predetermined value A2. The output signal of the comparator 7 is fed back to an ENABLE-input 8 of the counter 1. The output signals of the comparators 5 and 6 are applied to an OR-gate 9 whose output signal is applied to a D-flipflop 10. The D-flipflop 10 is also clocked by means of the signal $S_{PLL}$. The output signal of the D-flipflop 10 is applied to an input 11 of a second counter 12. By means of the signal present at this input 11, the counting device of the counter 12 is changed-over. The signal $S_{PLL}$ of the phase-locked loop also is applied to a clock input 13 of the counter 12.

The output signal present at an output 14 of the counter 12 is applied to three comparators 15, 16 and 17. The comparator 15 compares the output signal present at the output 14 of the counter 12 for identity to the value zero, the comparator 16 for identity to a first presettable number W1 and the comparator 17 for identity to a second presettable number W2. The output signal of the comparator 16 is applied to the R-input of a RS-flipflop 18 whose output signal supplies a control signal $S_{off}$ which is used for switching a horizontal synchronizing circuit, more specifically a phase-locked loop, not shown in the figure.

The output signal of the comparator 15 is applied to the S-input of the flip-flop 18. In addition, the output signal of the comparator 15 is applied to an inverter 20, whose output signal is applied to an input of a NOR-gate 21. The output signal of the D-flipflop 10 is applied to the other input of this NOR-gate 21 and in addition to an inverter 22. The output signal of the comparator 17 is applied to a further inverter 23. The output signals of the two inverters 22 and 23 are applied to two inputs of a NOR-gate 24. The output signals of the NOR-gates 21 and 24 are applied to an OR-gate 25, whose output signal is applied to an ENABLE-input 26 of the counter 12.

Together with the comparators 5, 6 and 7, the counter 1 determines how many horizontal synchronizing pulses occur in each picture line. The signal $S_{PLL}$ which represents the output signal of a horizontal synchronizing circuit, more specifically a phase-locked loop, not shown, serves as the criterion for the duration of a picture line. This phase-locked loop produces a pulse during the duration of a picture line. As will be explained in more detail hereinafter, this also happens when the received television signal is disturbed or if no television signal is received at all.

If, during the duration of a picture line, no horizontal synchronizing pulse is produced, then the counter receives no clock pulse at its input 2 and consequently remains at its initial value zero. Then the comparator 5 applies a corresponding output signal to the OR-gate 9. If, in contrast thereto, more than one horizontal synchronizing pulse is counted during the duration of a picture line, namely, for example, A1-pulses (wherein A1 exceeds 1), then the comparator 6 produces a corresponding output signal. The value A1 is then that number of horizontal synchronizing pulses per picture line for which the switching criterion is satisfied when this value is exceeded. Thus, both in the case in which no horizontal synchronizing pulse per picture line is counted and for the case in which A1 or a larger number of pulses is counted in each picture line, a signal is applied to the OR-gate 9, which sets the flipflop 10.

When a number of horizontal sync pulses A2 is reached the comparator 7 resets the counter 1 to its initial position via the counter enable input 8. As a result, after the value A1 has been exceeded, the counter does not continue counting.

By means of its output signal, the D-flipflop 10 drives the second counter 12 in such a manner that when the output signal is present, i.e. when either the comparator 5 or the comparator 6 has responded, the counter 12 counts upwards. To that end the counter 12 is clocked by the output signal $S_{PLL}$ of the phase-locked loop (not shown). Consequently, the counter 12 counts that number of picture lines during which no, or more than A1, horizontal pulses are detected per picture line. In the normal case, that is to say in the case in which exactly one horizontal synchronizing pulse is detected per picture line, the counter 12 remains in its intial position, so that the comparator 15 applies a corresponding output signal to the S-input of the flipflop 18. The signal $S_{off}$ then is at its high level. This is the normal state in which a horizontal synchronizing circuit, not shown, is synchronized by means of the horizontal synchronizing pulses.

If, however, the switching criterion is still satisfied, then the counter 12 counts upwards in response to the signal then present at its input 11 and possibly reaches a first presettable number W1. If this number is reached, then the comparator 16 applies a corresponding output signal to the R-input of the flipflop 18, which subsequent thereto is switched to the low level. Then the signal $S_{off}$ switches the horizontal synchronizing circuit, not shown, to its rated frequency.

The output signals of the comparators 15 and 17 are used, via the circuitry formed by the gates 21, 24 for the purpose of switching the counter 12 to ENABLE, that is to say to stop the counting operation of the counter 12.

Hereinafter the mode of operation of the arrangement shown in FIG. 1 will be described with reference to FIGS. 2 and 3 for two examples of television signals which are beset with noise or are not available from time to time.

Figure 2:
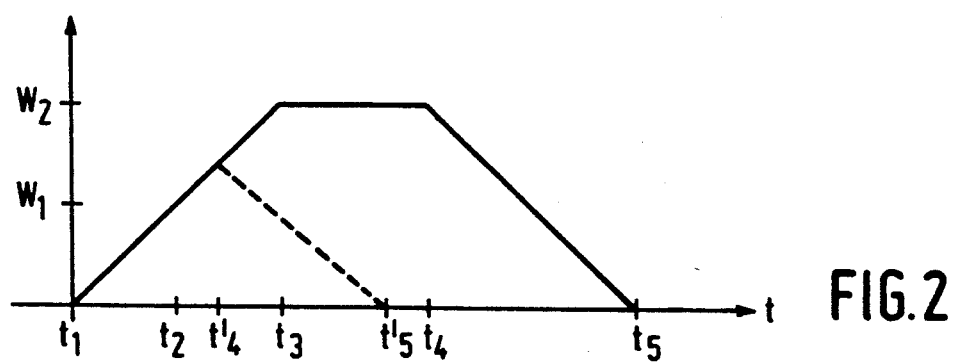
FIGS. 2 and 3 are signal diagrams of the synchronizing arrangement shown in FIG. 1.

The diagram shown in FIG. 2 shows schematically the signal present at the output 14 of the counter 12. It should be noted that in actual practice, the signal does not appear as a continuous signal, but is incremented in steps.

First, as a first example, it is assumed that at the instant t1 the switching criterion is satisfied. The counter 12 then receives a corresponding signal at its input 11, so that it counts up. This is effected in response to the output signal applied as a clock signal to its input 13 and obtained from the horizontal synchronizing circuit, not shown, which is, more specifically, a phase-locked loop. As long as the switching criterion remains satisfied, the counter 12 counts, first until the instant t2 at which the first presettable number W1 is reached. At that instant the comparator 16 responds and resets the flipflop 18.

Figure 3:
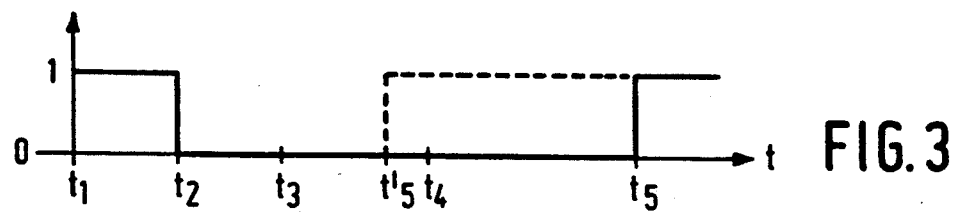

FIG. 3 shows the output signal $S_{off}$ of the RS-flipflop 18. In the case described in the foregoing in which the comparator 16 responds, the flipflop 18 is reset. This is indicated in FIG. 3 by the change of the output signal at the instant t2 from the high level to the low level. Thus, at the instant t2, a horizontal synchronizing circuit, not shown is switched such that it is no longer synchronized by means of the horizontal synchronizing pulses, but rather operates at a fixed rated frequency.

On the condition that also after the instant at which the value W1 is reached the switching criterion is still satisfied, the counter 12 continues counting until the value W2. As soon as this value has been reached, the comparator 17 responds and blocks the counter 12 so that the counter 12 does not continue counting. The count value consequently represents the maximum value to which the counter 12 counts. In the example shown in FIGS. 2 and 3, the switching criterion is still satisfied for the duration of some picture lines, also after the instant t3 at which the value W2 was reached. This continues until the instant t4. From the instant t4 the switching criterion is no longer satisfied. The counter 12 is now changed to the down-counting mode in response to the signal present at its input 11. In so far as the switching criterion is now not satisfied permanently, the counter counts down to its initial value which it reaches at the instant t5. Then the value zero has been reached so that the comparator 15 responds and sets the flipflop 18. As is shown in FIG. 3, this causes the output signal of the flipflop 18 to be adjusted to the high level again at the instant t5. This results in a subsequent horizontal synchronizing circuit being switched again to its synchronization mode by means of the horizontal synchronizing pulses.

In FIG. 2 a further example is shown in which the counter 12 does not reach its maximum value. This is shown by means of a broken line. In this example, at an instant t4' at which the counter 12 has exceeded the value W1 but has not yet reached the value W2, the switching criterion is not satisfied anymore. Hence, the counter 12 is switched to the down-counting mode by means of the switching signal present at its input 11. At the instant t5' the initial value zero has then been reached again in this example, so that the flipflop 18 is reset again. Therefore, at this instant, as is also shown in FIG. 3, the output signal of the flipflop 18 changes again from the low level to the high level. In this example the maximum value W2 is consequently not reached so that the count-back procedure has ended at an earlier instant and a switch over to synchronization in response to the horizontal synchronizing pulses starts at an earlier instant.

We claim:

1. A synchronizing arrangement for a picture display device comprising: a synchronizing signal separating stage in which horizontal synchronizing pulses are recovered from a television signal which contains a horizontal synchronizing composite signal applied thereto, a horizontal synchronizing circuit to which said horizontal synchronizing pulses are applied for synchronizing purposes, means for detecting a switching criterion which is satisfied when a predetermined number of horizontal synchronizing pulses per picture line is exceeded or when no horizontal synchronizing pulse per picture line occurs, and means coupled to said detecting means for switching the horizontal synchronizing circuit to a fixed rated frequency when the switching criterion is satisfied for a first presettable number of picture lines and for switching the horizontal synchronizing circuit to the synchronized state by means of the horizontal synchronizing pulses when the switching criterion is no longer satisfied for a second presettable number of picture lines.

2. An arrangement as claimed in claim 1, wherein the second presettable number of picture lines is the sum of the first presettable number of picture lines and that number of picture lines during which the switching criterion was still satisfied after the first presettable number of picture lines had been reached.

3. An arrangement as claimed in claim 2, wherein the second presettable number is limited to a presettable maximum value.

4. An arrangement as claimed in claim 1 to, wherein the first presettable number is in the range from 25 to 35 picture lines.

5. An arrangement as claimed in claim 3, wherein the maximum value is located in the range from 50 to 70 picture lines.

6. An arrangement as claimed in claim 1 to, wherein the predetermined number of horizontal synchronizing pulses per picture line, that satisfy the switching criterion is located in the range from 5 to 15.

7. An arrangement as claimed in claim 1, wherein the detecting means comprises, a first counter coupled to said synchronizing signal separating stage for counting the number of horizontal synchronizing pulses per picture line and, when the switching criterion has been satisfied, applies a corresponding signal to a second counter which is clocked by an output signal of the horizontal synchronizing circuit and, when the switching criterion is satisfied, counts the picture lines starting from an initial position and when the first presettable number of picture lines is reached triggers the changeover of the horizontal synchronizing circuit to the rated frequency.

8. An arrangement as claimed in claim 7, characterized in that the second counter counts to said second presettable number which is not more than a given maximum value.

9. An arrangement as claimed in claim 8, wherein the second counter counts back again to its initial position when the switching criterion is no longer satisfied and triggers the feedback of the horizontal synchronizing pulses to the horizontal synchronizing circuit when the initial counting position is reached.

10. An arrangement as claimed in claim 2, wherein the first presettable number is in the range from 25 to 35 picture lines.

11. An arrangement as claimed in claim 2, wherein the predetermined number of horizontal synchronizing pulses per picture line that satisfy the switching criterion is in the range from 5 to 15.

12. An arrangement as claimed in claim 3, wherein the predetermined number of horizontal synchronizing pulses per picture line that satisfy the switching criterion is in the range from 5 to 15.

13. An arrangement as claimed in claim 4, wherein the predetermined number of horizontal synchronizing pulses per picture line that satisfy the switching criterion is in the range from 5 to 15.

14. A synchronizing arrangement for a picture display device comprising:
a first input for receiving horizontal synchronizing pulses from a synchronizing signal separating stage of the picture display device,
a second input for receiving an output signal of a horizontal synchronizing circuit normally synchronized by said horizontal synchronizing pulses, first counting means coupled to said first and second inputs, a first logic circuit coupled to an output of the first counting means for producing at its output a first control signal in the presence of a switching criterion which is satisfied when a predetermined number of horizontal synchronizing pulses per picture line is exceeded or when no horizontal pulse per picture line occurs, second counting means coupled to the output of the first logic circuit and to said second input, and a second logic circuit coupled at least to an output of the second counting means to produce at its output a second control signal for application to said horizontal synchronizing circuit whereby the horizontal synchronizing circuit is switched to a fixed frequency after a first presettable number of picture lines and when the switching criterion is no longer satisfied the horizontal synchronizing circuit is again switched to the synchronized state after a second presettable number of picture lines.

15. A synchronizing arrangement as claimed in claim 14 wherein the second logic circuit includes means responsive at least to the output of the second counting means for supplying a blocking signal to said second counting means to block the counting thereof at a given maximum count value which is greater than said first presettable number thereby to limit the second presettable number to a given maximum value.

16. A synchronizing arrangement as claimed in claim 14 wherein the second presettable number of picture lines is the sum of the first presettable number of picture lines and that number of picture lines during which the switching criterion was still satisfied after the first presettable number of picture lines had been reached.

17. An arrangement as claimed in claim 1, wherein the switching means only switches the horizontal synchronizing circuit to said fixed rated frequency if the switching criterion is satisfied for a first presettable number of picture lines that occur consecutively.

18. An arrangement as claimed in claim 17 wherein said switching means includes counting means for counting said first presettable number of picture lines and which counting means is reset to a start count if the switching criterion is absent for even one picture line of a consecutive number of said first presettable number of picture lines.

19. A synchronizing arrangement for a picture display device comprising:

means controlled by horizontal synchronizing pulses and by an output signal of a horizontal synchronizing circuit of the picture display device for detecting a switching criterion that is satisfied when a predetermined number of horizontal synchronizing pulses per picture line is exceeded or when no horizontal synchronizing pulse per picture line occurs, and means coupled to an output of said detecting means for generating a switching signal for switching the horizontal synchronizing circuit to a fixed rated frequency when the switching criterion is satisfied for a first presettable number of picture lines and, when the switching criterion is no longer satisfied, for switching the horizontal synchronizing circuit to the synchronized state after a delay time determined at least in part by the length of time that the switching criterion was satisfied, said generating means including counting means controlled by an output signal of said detecting means and by said output signal of the horizontal synchronizing circuit.

20. A synchronizing arrangement as claimed in claim 19 wherein said generating means further comprises a feedback logic circuit coupled between an output of the counting means and a control input thereof.

21. An arrangement as claimed in claim 1, wherein the second presettable number is limited to a presettable maximum value.

* * * * *

UNITED STATES PATENT AND TRADEMARK OFFICE
CERTIFICATE OF CORRECTION

PATENT NO. : 5,161,011
DATED : NOVEMBER 3, 1992
INVENTOR(S) : GERHARD PLETZ-KIRSCH ET AL

It is certified that error appears in the above-indentified patent and that said Letters Patent is hereby corrected as shown below:

IN THE ABSTRACT
line 9, delete "," and insert --a--.

Claim 4, column 8, line 13, delete "to".

Claim 6, column 8, line 21, delete ",".

Claim 8, column 8, line 36, delete "character-";
               line 37, change "ized in that" to
                      --wherein--; delete "said
                      second";
             line 38, delete "presettable number which
                      is".

Signed and Sealed this

Fifteenth Day of March, 1994

Attest:

BRUCE LEHMAN

Attesting Officer      Commissioner of Patents and Trademarks